United States Patent [19]

Carpenter

[11] 4,278,578

[45] Jul. 14, 1981

[54] COATING COMPOSITION FOR SYNTHETIC PLASTIC SUBSTRATES AND METHODS FOR PREPARING AND USING SAME

[75] Inventor: Dale Carpenter, Agency, Mo.

[73] Assignee: Hillyard Enterprises, Inc., St. Joseph, Mo.

[21] Appl. No.: 91,379

[22] Filed: Nov. 5, 1979

[51] Int. Cl.³ .............................................. G08L 93/00
[52] U.S. Cl. .......................... 260/27 R; 260/29.2 TN; 260/29.6 NR; 428/423.3; 428/424.6
[58] Field of Search ............... 260/29.2 TN, 29.6 NR, 260/27 R, 29.6 WB, 29.6 TA; 525/125

[56] References Cited

U.S. PATENT DOCUMENTS

| | | | |
|---|---|---|---|
| 3,360,494 | 12/1967 | Bolinger | 260/29.6 |
| 3,859,112 | 1/1975 | Kohmura et al. | 260/29.6 NR |
| 4,046,726 | 9/1977 | Meiner | 260/27 R |

*Primary Examiner*—Theodore E. Pertilla
*Attorney, Agent, or Firm*—Dressler, Goldsmith, Shore, Sutker & Milnamow, Ltd.

[57] ABSTRACT

A coating composition useful for plastic substrates is disclosed which comprises water having about 1–25% carboxy functional urethane polymer, about 1–25% carboxy functional acrylic copolymer, and about 1–10% aqueous alkali soluble resin dispersed therein. This composition is cross-linked by about 0.2–3% of a polyfunctional aziridine which may be added immediately before use, or prior thereto.

18 Claims, No Drawings

COATING COMPOSITION FOR SYNTHETIC PLASTIC SUBSTRATES AND METHODS FOR PREPARING AND USING SAME

DESCRIPTION

1. Technical Field

The present invention relates to coating compositions, particularly those suited for synthetic plastic substrates, and methods for their preparation and use.

2. Background Art

Synthetic plastics are particularly useful as covering materials and these coverings frequently find use as flooring. Coverings made from polyurethane or polyvinylchloride are among the most commonly used substrates for floors, particularly gymnasium floors.

While these flooring substrates have been an improvement over previously used wooden flooring, maintaining the appearance of these floors has become a major problem. Particular problems with floor appearance include scuffing and the general durability of the floor coating so that longer time intervals may elapse between the times at which the floor should be recoated. In addition, it is advantageous if a floor coating can be applied from a water based system, thereby alleviating many of the problems associated with organic solvent vehicles, such as odor, flammability, toxicity, and the like.

DISCLOSURE OF THE INVENTION

The present invention relates to aqueous coating compositions comprising water having dispersed therein a polyfunctional aziridine cross-linking agent, a carboxy functional urethane polymer, a carboxy functional acrylic copolymer and an aqueous, alkali soluble carboxy functional resin selected from the group consisting of dibasic acid modified rosin esters and styrene-maleic anhydride copolymers. These coating compositions have a solids content of about 5 to 65 weight percent and are comprised of about 1 to about 25 weight percent of the urethane polymer, about 1 to about 25 weight percent of the acrylic copolymer, about 1 to about 10 weight percent of the aqueous alkali soluble resin and about 0.2 to about 3 weight percent of the polyfunctional aziridine, all based upon the total weight of the composition. The aziridine cross-links the carboxy functional components.

One of the many benefits of the present invention is that it may be used on several types of synthetic plastic substrate such as resilient flooring, vinyl flooring, urethane flooring and the like. In addition, the coatings produced on the synthetic plastic substrates show an enhancement in general durability and a reduction in scuffability. Yet another advantage of the present invention is that the instant coating compositions are water borne systems, and thereby alleviate some of the problems associated with coating compositions which are carried in organic solvents. Still another advantage of the present invention is that the cross-linked composition may be stripped from the synthetic plastic substrate prior to putting on a new layer of coating, or, a new larger of coating may be put directly on top of that which is already present.

DETAILED DESCRIPTION OF THE INVENTION

The aqueous coating compositions of this invention are comprised of four principal components in addition to water. These components are a polyfunctional aziridine cross-linking agent, a carboxy functional urethane polymer, a carboxy functional acrylic copolymer and an aqueous alkali soluble carboxy functional resin selected from the group consisting of dibasic acid modified rosin esters and styrene-malaic anhydride copolymers. While each of the individual components has been used previously in coating compositions, the prior art does not teach or suggest that these four components are compatible, let alone that when combined, they will form a superior coating composition.

Thus, in a preprint of a paper presented at the 172nd meeting of the American Chemical Society in San Francisco, California, held on August 30–September 3, 1976, Volume 36, No. 2, Division of Organic Coatings and Plastic Chemistry at pages 431–436, the authors, Cala and Lapkin discuss water dispersed, urethane polymers having ionic groups within the polymer backbone. These authors state at page 435 that their water dispersible polyurethanes may be cross-linked with cross-linking agents such as polyfunctional aziridines and melamine derivatives. The authors also state that the urethane dispersions may be mixed and are compatible with acrylic, alkyd and vinyl lattices to produce films of good integrity and clarity. It is additionally known that polyfunctional aziridine compounds may be used to cross-link acrylic ester polymers containing carboxylic acid functionalities.

However, while it is known that each of the two above polymers may be cross-linked individually, and that these polymers may be mixed in an uncross-linked composition to form compositions having good film properties, the mixing and cross-linking of these two polymers in the presence of the aqueous alkali soluble resin as described hereinbelow is neither taught nor is it suggested by the art. Additionally, the benefits derivable from incorporating an aqueous alkali soluble resin into a composition containing an aqueous urethane dispersion and an aqueous dispersion of a carboxylic acid containing acrylic ester polymer is neither taught nor suggested.

The cross-linking agents of the instant invention are polyfunctional aziridine derivatives. By polyfunctional it is meant herein that there are at least two nitrogen atoms present in the cross-linking agent. As these cross-linking agents are aziridines, one of the nitrogens is in an aziridine ring, while the other is present in a side chain bonded to the aziridine nitrogen. An example of the simplest polyfunctional aziridine cross-linking agent would be N-(aminoethyl)aziridine. Those polyfunctional aziridine compounds having about three to about five nitrogen atoms per molecule of cross-linking agent are preferable. Examples from this class of cross-linking agents include N-aminoethyl-N-aziridylethylamine, N,N-bis-2-aminopropyl-N-aziridylethylamine, and N-3, 6, 9-triazanonylaziridine. Most preferred, is a trifunctional aziridine cross-linker having an equivalent weight of 156 atomic mass units which is sold under the trademark designation CX100 by Polyvinyl Chemical Industries.

The polyfunctional aziridine cross-linking agent may react with the below-described carboxy functional ingredients in a number of fashions. First, it may cross-link by purely ionic means through salt bridges formed between the protonated nitrogen atoms of the cross-linker and the anionic carboxy functionalities present. In a second mechanism, the aziridine ring may be opened by reaction with a carboxy functionality to produce an amino (or ammonium) ester, with the other nitrogen atoms present completing the cross-linking reaction via salt bridge formation or other chemistry. In another possible mechanism, the aziridine containing cross-linker can react with itself via a ring opening polymerization-type reaction to form higher molecular weight polyamines which can also cross-link by the salt bridge, ionic, means or ester formation means as above-described. It is presently not known which, if any, of the above mechanisms takes place during the cross-linking reaction, nor if some of the above mechanisms are responsible for the cross-linking, to what extent any of them contribute.

The polyfunctional aziridine cross-linking agent may be present from about 0.2 to about 3 weight percent of the total solids of the composition, and preferably from about 0.2 to about 1 weight percent of the total composition. Below about 0.2 weight percent, the desired cross-linking properties are not sufficiently manifest in the dried composition. Above about 3 percent of the total solids of the composition, the aziridine compound appears to only further react with itself and not assist in the production of desirable properties in the coating composition.

Urethane containing coating compositions have been used for imparting abrasion resistance, flexibility, and fast cure to floor covering systems. These materials are usually made by the reaction of a polyfunctional isocyanate with a polyol. An example of an aromatic polyfunctional isocyanate, is toluene diisocyanate. Aliphatic isocyanates such as methylene dicyclohexyl isocyanate, hexamethylene diisocyanate, and isophorone diisocyanate also are used to produce clear, yellowing-resistant coatings.

Typical polyols for producing water soluble or dispersable urethanes include tertiary amine glycols, such as N-methyl diethanolamine, which form soluble polymers in acidified solutions, long-chain polyethylene glycol ethers such as polyoxyethylene (6) or polyoxyethylene (12) have also been reacted with diisocyanates to produce water soluble polyurethanes.

Preferably, an aqueous dispersion of a carboxy functional urethane polymer is used for the compositions of this invention. These urethane polymers may have aliphatic or aromatic backbones having ionic, carboxylic acid or carboxylate groups pendant therefrom which provide stable dispersions without the aid of surfactants. Additionally, a tertiary amine, such as triethylamine, may be incorporated at about 0.5–5% by weight of the urethane polymer to assist in dispersability.

The presently preferred aqueous colloidal dispersion of a carboxy functional aliphatic urethane has a solids content of about 33–35 weight percent, a pH value of about 7.5–8.5, a viscosity of about 400–800 cps, and a density of about 8.8 lbs./gal. It is produced under the tradename NeoREZ R-960 by Polyvinyl Chemical Industries.

The presently preferred aqueous colloidal dispersion of a carboxy functional aromatic urethane has a solids content of about 30–32 weight percent, a pH value of about 9, a viscosity of about 150–450 cps at 25° C. and a density of about 8.7 lbs./gal. at 25° C. It is sold under the tradename NeoREZ EX-466, also by Polyvinyl Chemical Industries.

The colloidally dispersed urethane polymer may be present in the compositions of this invention at about 1 to about 25 weight percent of the composition, as solids. Preferably, this polymer is present at about 5 to about 15 weight percent of the total composision as solids.

When used at less than about 1%, the final, dried, cross-linked composition has poor wear characteristics. When used at greater than about 25 weight percent of the solids, no greater wear resistance is imparted to the composition and further additions become merely wasteful.

A carboxy functional acrylic copolymer is also present as a component of the compositions of this invention. Carboxy functional acrylic copolymers used in coating compositions are well-known in the art, and typically are comprised of about 3 to about 40% by weight carboxylic acid or carboxylate monomer along with other neutral group-containing monomers. The carboxylic acid or carboxy groups in these copolymers are typically derived from monoethylenically unsaturated carboxylic acid monomers such as acrylic acid, methacrylic acid, crotonic acid and the like. The pendent neutral groups of these copolymers are typically from non-functional monomers such as styrene, acrylonitrile, vinyl esters such as vinyl acetate, vinyl ethers such as methyl vinyl ether and preferably, $C_1$–$C_8$ aliphatic esters of methacrylic acid and acrylic acid such as methyl methacrylate, butyl acrylate and the like.

The presence of the carboxy functional acrylic copolymers assists the composition's wear characteristics and also improves the ease of strippability with alkaline strippers is when it is desired to remove the coating composition.

These copolymers are frequently supplied as latex emulsions having some or all of the carboxy functionality neutralized by volatile amines such as ammonia, ethanolamine, methyl diethanolamine and the like. In addition, multivalent metal ions, particularly divalent metal ions, may be used as counter ions and/or cross-linking agents for these carboxy functional acrylic copolymers. The divalent zinc ion is particularly preferred as a multivalent metal ion for this purpose.

An acrylic copolymer latex having a solids content of about 31–33 weight percent, a pH value of about 7.7–8.3, a viscosity at 25° C. of about 150–300 cps and a density of 25° C. of about 8.5 lbs./gal. sold under the tradename Neocryl A-604 by Polyvinyl Chemical Industries is particularly preferred. This material is suggested by its manufacturer for use in wood finishing, rather than in the application to a less porous, plastic substrate as it is used herein.

Another particularly preferred carboxy functional acrylic copolymer is the all acrylic copolymer latex consisting essentially of acrylate and methacrylate esters of alcohols having 1–8 carbon atoms in addition to the carboxy functionality. This material is cross-linked by divalent zinc ions, has about 38 weight percent solids, a pH value of about 8.7–9.5, and is sold under the tradename Rhoplex B-1339 by Rohm and Haas Company.

The carboxy functional acrylic copolymers, whether multi-valent metal ion cross-linked or not, may be used interchangeably to comprise about 1 to about 25 weight percent of the compositions as solids. Aside from improving the wear characteristics and ease of removal of the compositions, these polymers also act as extenders for the more expensive urethane polymers. Thus, when used at less than about 1% by weight of the solids of the composition, not only are wear and strippability characteristics of the instant compositions impaired, but the compositions also become less satisfactory from an economic point of view. When used at greater than about 25 weight percent of the total composition, the wear characteristics may become diminished. In more preferred practice, these copolymers are used at about 5 to about 15 weight percent of the total composition, as solids.

The fourth component other than water of the compositions of this invention, is an aqueous alkali soluble resin which may be selected from dibasic acid modified rosin esters or styrene-maleic anhydride copolymers. Rosin is a solid resinous material which is obtained from pine trees and contains about 90% resin acids and about 10% non-acidic materials. The resin acids are principally composed of abietic acid and l-sapietic acid, otherwise known as l-pimaric acid. These resin acids may be modified by reaction with unsaturated dibasic acids or anhydrides such as maleic anhydride, maleic acid, fumaric acid and the like to produce materials known in the art as modified rosins, or dibasic acid modified rosins. Rosins may also be esterified with alcohols such as phenol, ethylene glycol, glycerol, pentaerythritol and the like to form rosin esters. Rosins which are reacted both with monoethylenically unsaturated dibasic acids or anhydrides and alcohols are known in the art as dibasic acid modified rosin esters.

These dibasic acid modified rosin esters are soluble in aqueous alkali, alcohols and glycols and are reported by one manufacturer to be useful as an ink vehicle resin for water-based gravure and flexographic inks. These materials assist in imparting hardness to the coated film as well as assisting removal of the films from the coated substrate.

A particularly preferred dibasic acid modified rosin ester is sold under the tradename Pentalyn 269 by Hercules, Inc. This material is an ester of pentaerythritol having an acid number of about 190–210, and preferably about 200, and a softening point by the Hercules drop method of about 170°–180° C.

Styrene-maleic anhydride copolymers may be used in mixture with or as a replacement for the above-mentioned rosin derivatives. These materials typically have molecular weights between about 1500 and about 3000 atomic mass units and acid numbers of about 200 to about 280. They are known in the art as leveling resins for floor polishes and assist in imparting detergent resistance, strippability and water resistance to the polishes.

Particularly preferred styrene-maleic anhydride copolymers useful in the instant invention include polymers produced by ARCO Chemical Company under the tradename designation SMA 2625A and SMA 1725A. These materials are both provided as powders or flakes. They have acid numbers of 220 and 260, molecular weights of about 1900 and about 2200 and melting ranges of about 135°–150° C., and about 140°–155° C., respectively.

The aqueous alkali soluble resins may be present at about 1 to about 10 weight percent of the composition, as solids. They are more preferably present at about 2 to about 6 weight percent, as solids.

Aside from the properties mentioned hereinabove, these aqueous alkali soluble resins are also useful in part as extenders for the composition. Consequently when used at less than about 1 weight percent of the solids of the composition, the compositions tend to be economically less attractive. When used at greater than about 10% of the compositions, the dried, cross-linked film of the composition tends to become too hard, and flaking may result.

Upon formulation of the above-identified ingredients, the compositions of this invention have a pH value of about 8–10, and preferably about 8.5–9.5.

In addition to the above-mentioned water and four components, other materials may be added to the composition to improve its shelf life, dispersability, plasticization of the final dried, cross-linked coating and the like. Some of these added ingredients include dispersing surfactants such as potassium fluorinated alkyl carboxylates, like that sold under the tradename FLUORAD surfactant FC-128 sold by the Commercial Chemicals Division of the 3-M Company. Anti-foaming agents may also be included such as a polydimethylsiloxane aqueous emulsion sold by the SWS Silicones Division of Stauffer Chemical Company under the tradename designation SWS-211. Formalin may be included in the composition to retard bacterial or fungal growth. Plasticizers such as tributoxyethyl phosphate or dibutyl phthalate may be used. In addition, amounts less than about 10% of the total composition, of a water miscible organic solvent such as ethylene glycol, diethylene glycol monoethyl ether, diethylene glycol monomethyl ether and the like may also be included.

The compositions of this invention are typically prepared for use as either one or two component systems, depending upon the desired stripping characteristics for the dried coating compositions after application.

To prepare the two component system, the urethane dispersion is further dispersed in deionized water. The carboxy functional acrylic copolymer latex is then added with continuous and moderate mechanical agitation. The aqueous alkali soluble resin, which is normally supplied as a solid material, may be dissolved in an ammoniacal aqueous solution at about 15 to about 25 weight percent resin solids level and then added to the above-mentioned components with continued moderate agitation.

When an organic solvent, plasticizing agent, dispersing agent, anti-foaming ingredient and/or preservative are used, they may be prepared as a premix, and the premix added to the above components with agitation. Thus, an organic solvent may be dissolved in water and the plasticizer added thereto and mixed therein. The dispersing agent may then be added followed the defoaming agent and preservative. Upon addition of this premix to the other components and suitable agitation so that a substantially homogeneous composition is achieved, the preparation of the first component of the two component system is complete.

The second component of this two-component system is comprised of the polyfunctional aziridine crosslinker. This material is generally supplied as a 100 percent active liquid, and may be repackaged for sale to users as such.

To apply this two-component system, the first component is made and stored until it is desired to apply it to a substrate. At this application time, the cross-linking agent is added in an appropriate amount and mechanically mixed therein for about 5 minutes. The coating product is then ready to be applied, and should preferably be applied to the substrate within about 4 hours of mixing.

The dried, cross-linked compositions prepared from the two component systems may be stripped from the substrate by use of alkaline stripping agents, such as those containing ammonia, sodium or potassium hydroxides, sodium or potassium silicates, trisodium or tripotassium phosphate, and the like. Additionally, these materials may also be removed from the substrate with the aid of an organic solvent such as methylene chloride.

Removability of the dried, cross-linked coating compositions of this invention may also be made easier by increasing the concentrations of the acrylic copolymer or the akali soluble resin, or both relative to the amount of urethane polymer present. Thus, using a ratio of carboxy functional urethane solids to the sum of the solids imparted by the carboxy functional acrylic copolymer plus those of the aqueous alkali soluble carboxy functional resin in the range of about 1:5 to about 1:15, tends to maximize the ease of strippability with the alkaline stripping materials discussed hereinabove, while not significantly impairing the other desirable qualities of the coating composition. Preferably, this ratio is in the range of about 1:8 to about 1:12.

The one component system of the coating compositions of this invention may be prepared in a manner similar to that hereinabove described with the exception that the polyfunctional aziridine cross-linking agent is added to the other components when they are mixed. In this case, the final composition may be stirred for about 15 minutes after the addition of the cross-linking agent, and then the composition packaged for use. It is thought that the composition cross-links during and after the mixing operation. Although cross-linked, the composition is stable on storage and may be applied to substrates such as vinyl flooring with little difficulty. After application, the dried, cross-linked coating composition of the one component system may be stripped from its substrate with the assistance of an organic solvent such as methylene chloride.

Both the one and the two component systems may be applied to the plastic substrates by means well-known in the art for applying floor coatings, polishes and the like. These materials may also be reapplied over a first layer of a similar composition already present on the substrate, should that be desirable.

BEST MODES FOR CARRYING OUT THE INVENTION

EXAMPLE I

Two-Component Coating Composition System

The following ingredients were added to a glass beaker in the order listed hereinbelow while employing continuus, moderate mechanical agitation:

| Ingredient | Parts by Weight | % Solids |
|---|---|---|
| COMPONENT A | | |
| Carboxy Functional Urethane Dispersion (Note 1) | 16.74 | 5.7 |
| Deionized Water | 33.15 | |
| Carboxy Functional Acrylic Copolymer (Note 2) | 22.66 | 8.6 |
| Alakli Soluble Carboxy Functional Resin (Note 3) | 20.73 | 4.0 |
| Premix | | |
| Ethylene glycol | 1.40 | |
| Deionized Water | 3.29 | |
| Tributoxyethyl Phosphate | 0.35 | |
| Dispersant (Note 4) | 0.08 | |
| Anti-Foaming Agent (Note 5) | 0.007 | |
| Formalin | 0.105 | |
| | 99.51 | |
| COMPONENT B | | |
| Polyfunctional Aziridine Cross-linking Agent (Note 6) | 0.49 | 0.5 |

1. The colloidal dispersion of a carboxy functional aliphatic urethane sold under the trademark name NeoREZ R-960 by Polyvinyl Chemical Industries may be used.
2. The carboxy functional aqueous latex sold under the trademark name Rhoplex B-1339 Rohm and Haas Company may be used.
3. The dibasic acid modified rosin ester sold under the trademark name Pentalyn 269 by Hercules, Inc. may be used after dissolution at 19 weight percent in an ammoniacal, aqueous solution.
4. A potassium fluorinated alkyl carboxylate surfactant such as that sold under the trademark name FLUORAD FC-128 by the Commercial Chemicals Division of the 3-M Company may be used.
5. A polydimethylsiloxane aqueous emulsion such as that sold under the trademark name SWS-211 by the SWS Silicones Division of Stauffer Chemical Company may be used.
6. The trifunctional aziridine cross-linking agent sold under the trademark designation CX100 by Polyvinyl Chemical Industries may be used.

After adding each of the above ingredients of Component A, the composition batch is allowed to mix for several minutes before the addition of the next ingredient. Preparation of the composition is carried out at ambient temperature and pressure.

The above Components A and B were added together and mixed mechanically for about 5 minutes, and the pH value adjusted to between 8.5 and 9.5. The resulting composition was then applied to a vinyl flooring and allowed to dry at ambient temperature. After drying, the coated vinyl flooring showed a general enhancement of durability of the coating and a reduction in scuffability when compared with other commercially available materials.

If the solids level of the carboxy functional urethane dispersion is lowered to 2.0 weight percent of the total composition and the solids levels of the carboxy functional acrylic copolymer and alkali soluble carboxy functional resin are raised to 10.6 and 5.7 weight percents of the total composition, respectfully, while keeping the remaining components in the composition at the same relative levels, and the cross-linked composition is applied to a vinyl flooring and allowed to dry, the dried coating may be readily removed from the flooring with commercially available alkaline stripping compositions.

EXAMPLE 2

ONE COMPONENT SYSTEM

Component A of Example 1 was prepared in a fashion identical to that first described hereinabove. Component B of Example 1 was then added thereto and the resulting admixture stirred mechanically for about 15 minutes. The composition thereby obtained was also applied to a vinyl floor covering and gave durability and scuffability results similar to those discussed hereinabove.

The above detailed description has been given for ease of understanding only. No unnecessary limitations are to be understood therefrom, as modifications will be obvious to those skilled in the art.

What is claimed is:

1. An aqueous coating composition comprising water having dispersed therein a polyfunctional aziridine cross-linking agent, an aqueous colloidal dispersion of a carboxy functional urethane polymer, a carboxy functional acrylic copolymer latex and an aqueous alkali soluble carboxy functional resin selected from the group consisting of dibasic acid modified rosin esters and styrene-maleic anhydride copolymers, said composition having a solids content of about 5 to about 65 weight percent, wherein said solids are comprised of about 1 to about 25 weight percent of said urethane polymer, about 1 to about 25 weight percent of said acrylic copolymer, about 1 to about 10 weight percent of said aqueous alkali soluble resin and about 0.2 to about 3 weight percent of said polyfunctional aziridine, all based on the total weight of said composition, said polyfunctional aziridine cross-linking said carboxy functional components.

2. The aqueous coating composition as defined in claim 1 wherein said aziridine cross-linking agent is trifunctional and has an equivalent weight of about 156 atomic mass units.

3. The aqueous coating composition as defined in claim 1 wherein the copolymer of said acrylic copolymer latex is zinc cross-linked and consists essentially of acrylate and methacrylate esters of alcohols having 1-8 carbon atoms in addition to said carboxy functionality, and is present at about 5 to about 15 weight percent of the composition as solids.

4. The aqueous coating composition as defined in claim 1 wherein said urethane polymer is present at about 5 to about 15 weight percent of the composition as solids.

5. The aqueous coating composition as defined in claim 1 wherein said aqueous alkali soluble resin is present at about 2 to about 6 weight percent of the composition as solids.

6. The aqueous coating composition as defined in claim 1 wherein said composition has a pH of about 8 to about 10.

7. The aqueous coating composition as defined in claim 1 wherein the ratio of carboxy functional urethane solids to the sum of the solids of the carboxy functional acrylic copolymer plus the solids of the aqueous alkali soluble carboxy functional resin is from about 1:5 to about 1:15.

8. The aqueous coating composition as defined in claim 7 wherein said ratio is from about 1:8 to about 1:12.

9. An aqueous coating composition comprising water having mixed therein a trifunctional aziridine cross-linking agent having an equivalent weight of about 156 atomic mass units and present at about 0.2 to about 1 weight percent of said composition, an aqueous colloidal dispersion of a carboxy functional urethane polymer present at about 5 to about 15 weight percent of said composition as solids, a carboxy functional, zinc cross-linked acrylic copolymer latex consisting essentially of acrylate and methacrylate esters of alcohols having 1-8 carbon atoms in addition to said carboxy functionality, said acrylic copolymer being present at about 5 to about 15 weight percent of said composition as solids, and an aqueous alkali soluble resin selected from the group consisting of dibasic acid modified rosin esters and styrene-maleic anhydride copolymers, said resin being present at about 2 to about 6 weight percent of said composition as solids, said trifunctional aziridine cross-linking said carboxy functional components, and said composition having a pH of about 8 to about 10.

10. The aqueous coating composition as defined in claim 9 wherein said dibasic acid modified rosin ester is selected from the group consisting of wood rosin modified with maleic anhydride, maleic acid and fumaric acid and esterified with an alcohol selected from the group consisting of phenol, glycerol, pentaerythritol and ethylene glycol.

11. The aqueous coating composition as defined in claim 9 wherein said styrene-maleic anhydride copolymer has a molecular weight of about 1500 to about 3000 atomic mass units.

12. A method for producing an aqueous coating composition comprising admixing water, a carboxy functional acrylic copolymer latex, an aqueous colloidal dispersion of a carboxy functional urethane polymer and an aqueous alkali soluble resin selected from the group consisting of dibasic acid modified rosin esters and styrene-maleic anhydride copolymers with moderate mechanical agitation and cross-linking said composition with a polyfunctional aziridine cross-linking agent.

13. The method of claim 12 wherein the copolymer of said polyacrylic latex is zinc cross-linked and is present at about 1 to about 25 percent by weight of the solids of said composition.

14. The method of claim 12 wherein said urethane polymer is present at about 1 to about 25 percent by weight of the solids of said composition.

15. The method of claim 12 wherein said dibasic acid modified rosin ester is selected from the group consisting of wood rosin modified with maleic anhydride, maleic acid and fumaric acid and esterified with an alcohol selected from the group consisting of phenol, glycerol, pentaerythritol and ethylene glycol.

16. The method of claim 12 wherein said 5 composition has a final pH of about 8 to about 10.

17. A method of producing an aqueous coating composition comprising the steps of
admixing water, an aqueous colloidal dispersion of a carboxy functional urethane polymer comprising about 5 to about 15 weight percent of the solids of said composition, a carboxy functional zinc crossed-linked acrylic copolymer latex present at about 5 to about 15 weight percent of the solids of said composition, and an aqueous alkali soluble resin selected from the group consisting of dibasic acid-modified rosin esters and styrene-maleic anhydride copolymers present at about 2 to about 6 weight percent of the solids of said composition, said admixture being mixed to substantial homogeneity between additions of each of said components; and
adding a trifunctional aziridine cross-linking agent having an equivalent weight of about 156 atomic mass units to said admixture at about 0.2 to about 1 weight percent of the total composition.

18. The method of claim 17 wherein said cross-linking agent is added to said admixture and the resulting composition is applied to a substrate within about four hours after said addition.

* * * * *